July 5, 1932. M. M. GOLDBERG 1,865,627
LEVER SET LEVER OPERATED CASH REGISTER
Filed Nov. 21, 1925 7 Sheets-Sheet 2

Inventor
Maximilian M. Goldberg
By
His Attorneys

July 5, 1932. M. M. GOLDBERG 1,865,627
LEVER SET LEVER OPERATED CASH REGISTER
Filed Nov. 21, 1925 7 Sheets-Sheet 3

Inventor
Maximilian M. Goldberg
By
His Attorneys

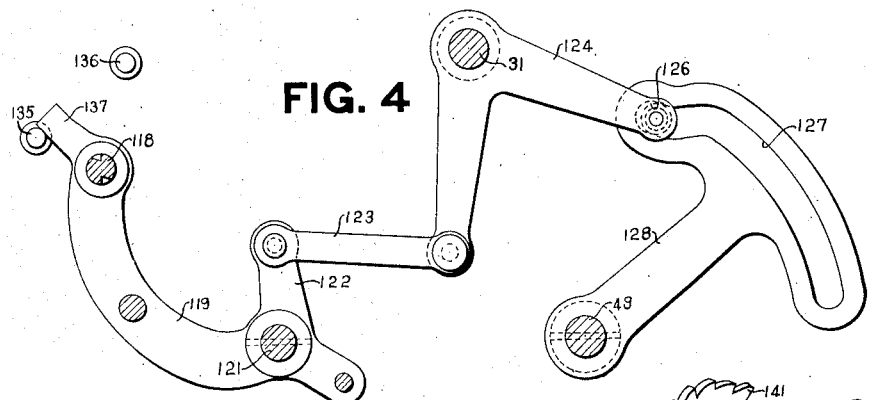
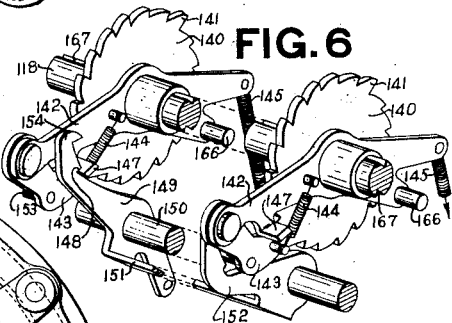
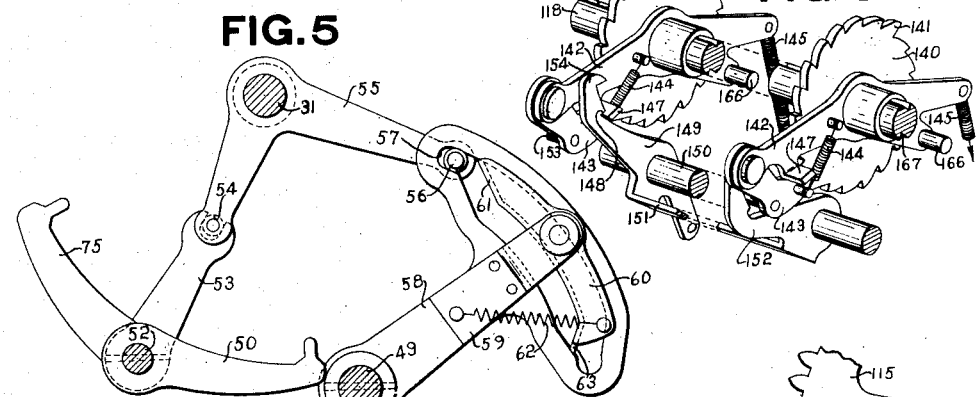

July 5, 1932.  M. M. GOLDBERG  1,865,627

LEVER SET LEVER OPERATED CASH REGISTER

Filed Nov. 21, 1925  7 Sheets-Sheet 5

Inventor
Maximilian M. Goldberg
By
His Attorneys

July 5, 1932. M. M. GOLDBERG 1,865,627

LEVER SET LEVER OPERATED CASH REGISTER

Filed Nov. 21, 1925 7 Sheets-Sheet 6

Inventor
Maximilian M. Goldberg
By *Earl Benest*
*Henry E. Stauffer*
His Attorneys July 5, 1932.  M. M. GOLDBERG  1,865,627
LEVER SET LEVER OPERATED CASH REGISTER
Filed Nov. 21, 1925   7 Sheets-Sheet 7

Inventor
Maximilian M. Goldberg
By *Pearl Beust*
*Henry E. Stauffer*
His Attorneys Patented July 5, 1932

1,865,627

UNITED STATES PATENT OFFICE

MAXIMILIAN M. GOLDBERG, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

LEVER SET LEVER OPERATED CASH REGISTER

Application filed November 21, 1925. Serial No. 70,580.

This invention relates to improvements in cash registers, and particularly to the lever set and lever operated type.

One object of the present invention is to provide an improved mechanism for setting indicators directly to their new positions without first passing through their zero positions during each operation of the machine.

Another object is to provide a mechanism for setting amount levers without disturbing the adjustment of the indicators.

With these and incidental objects in view, the invention consists of certain novel features of construction and combinations of parts, the essential elements of which are set forth in appended claims and a preferred form or embodiment of which is hereinafter described with reference to the drawings which accompany and form part of this specification.

In said figures:

Fig. 4 is a detail view of the mechanism for engaging and disengaging the totalizer.

Fig. 5 is a detail view of the mechanism for operating the alining devices for the amount levers and for the indicators.

Fig. 6 is a perspective view of one unit of the transfer mechanism.

Fig. 7 is a detail view of the totalizer shown in the normal or disengaged position.

Fig. 8 is a detail view of the totalizer shown engaged with its actuators and with the transfer carrying arm in its tripped position.

In general

Described in general terms, the machine includes a plurality of adjustable levers for determining the amounts which are to be entered into the totalizer. These levers control the extent and direction of movement of the indicators for displaying the amount which has been entered into the totalizer. The machine is operated by means of an operating lever, at the right-hand end of the machine, which lever is given a forward and backward stroke for each operation. The totalizer is provided with a transfer mechanism known in the art as a simultaneous transfer mechanism. The transfer carrying pawls are tripped, either as the totalizer elements move from "9" to "0", or by the motion of the transfer carrying pawls when the next higher denominational element is standing at "9" or is moving from "8" to "9" at the time. The actual carrying takes place as the totalizer is being disengaged from its actuators, this disengaging movement being utilized for performing this function.

In detail

Figure 1:
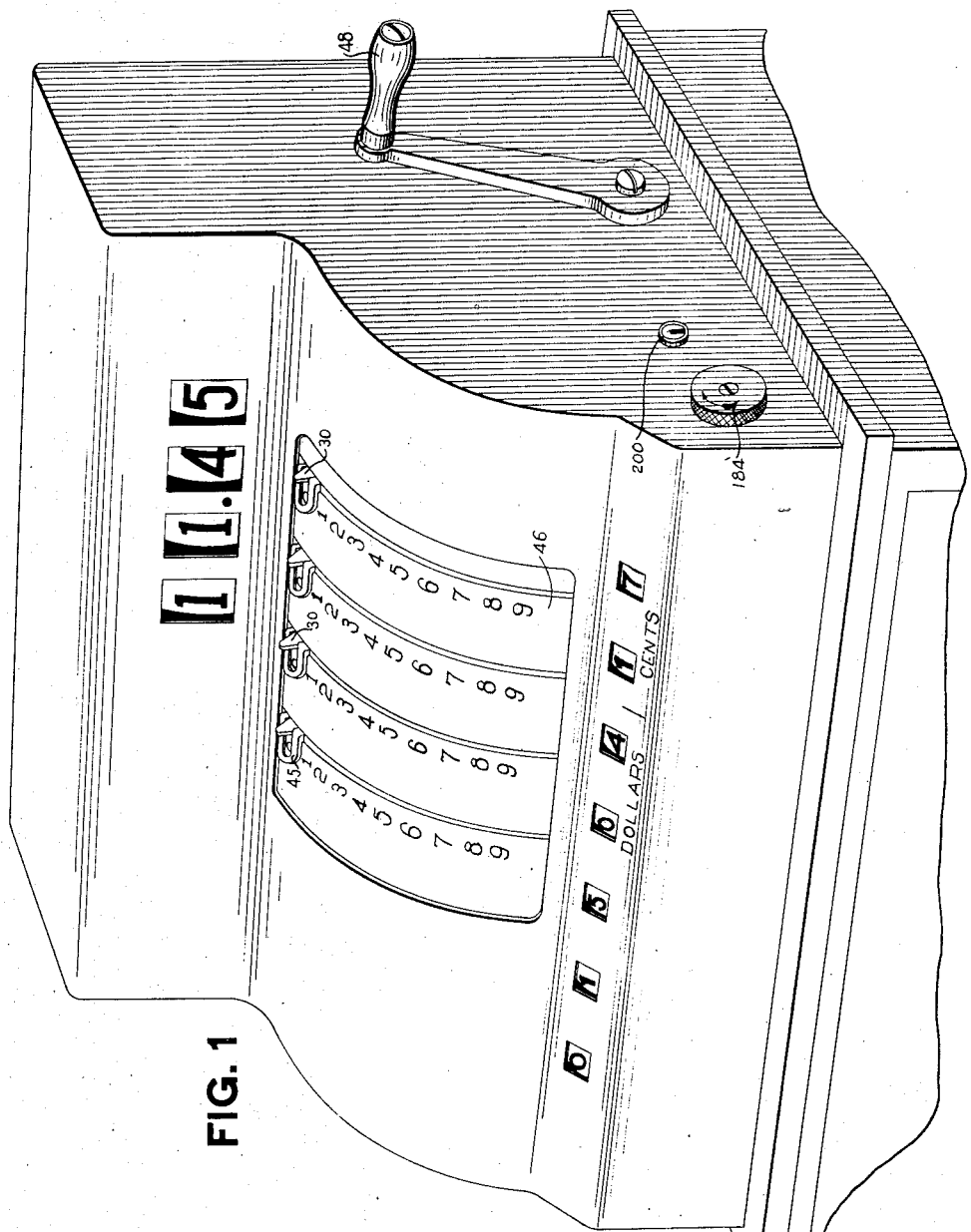
Fig. 1 is a perspective view of the machine with the cabinet thereon.
Figure 2:
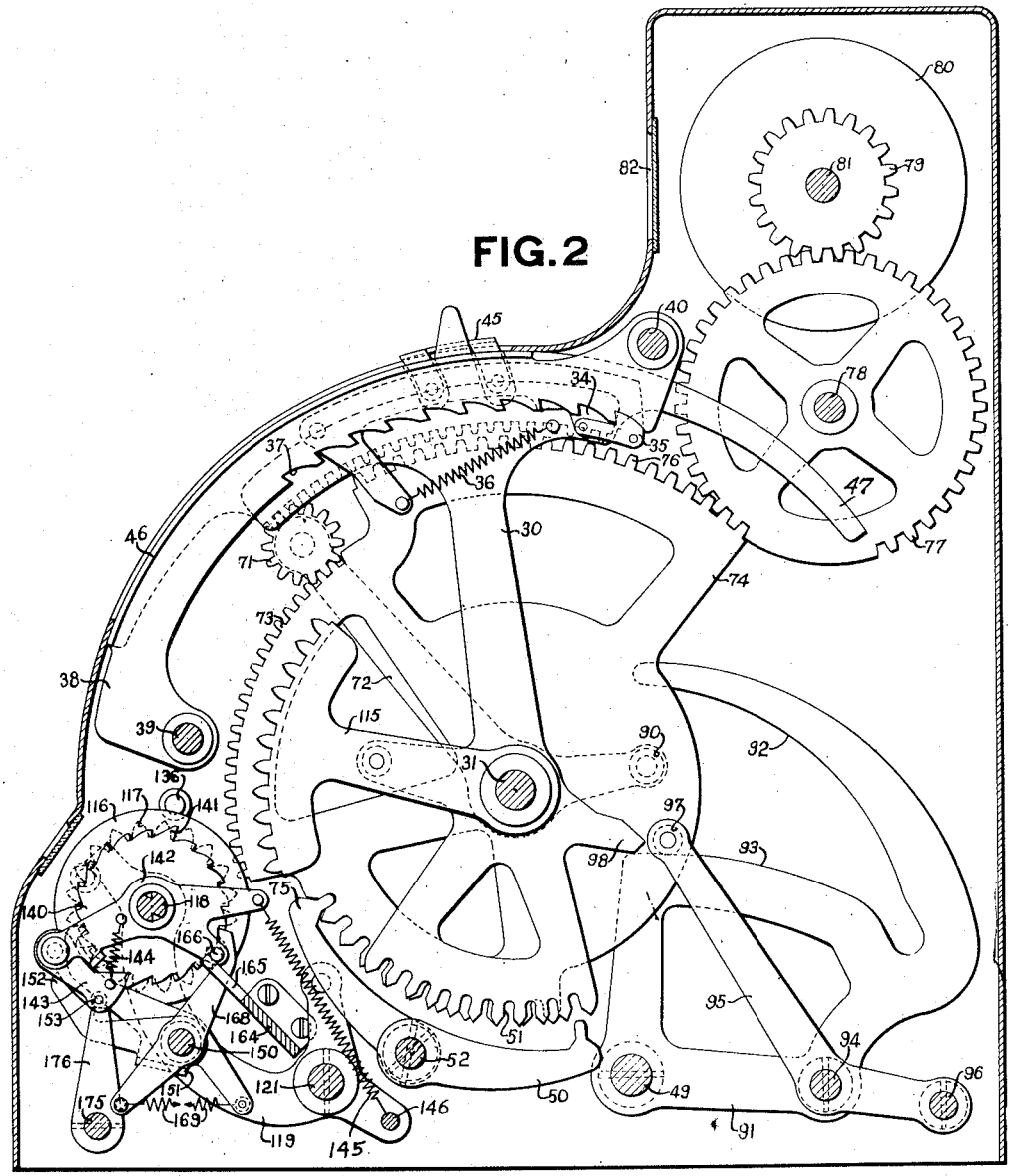
Fig. 2 is a section taken through the machine and shows the indicator, the totalizer and the actuating mechanism therefor.
Figure 11:
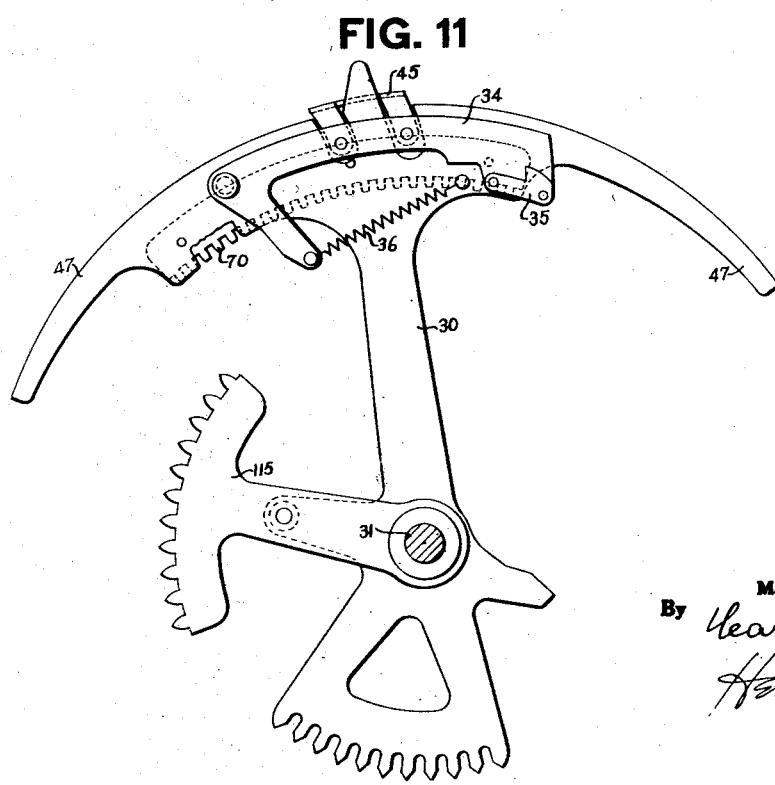
Fig. 11 is a detail view of an amount lever.
Figure 12:
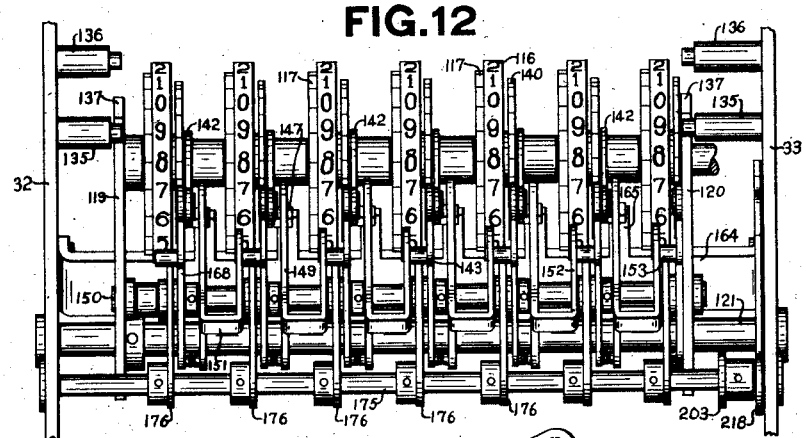
Fig. 12 is a front elevation of the totalizer.

*Amount lever.*—The machine as herein disclosed is provided with four levers 30 (Figs. 1, 2 and 11). It is not intended to limit the number of levers to four, as either more or less may be used depending upon the registering capacity desired. These levers are pivoted on a rod 31 carried by the side frames 32 and 33 (Fig. 12) of the machine. Pivoted on each of the levers 30 is a bell crank 34 which has secured thereto a pawl 35. A spring 36 stretched between a stud on the bell crank 34 and a stud on the lever 30 normally holds the pawl 35 in engagement with one of the notches 37 cut in the inner edge of a segmental plate 38 supported by two rods 39 and 40 carried by the side frames 32 and 33 of the machine. Also secured to the bell crank 34 is an index guide 45 (Figs. 1, 2 and 11). This guide is U-shaped, the bight of the U extending horizontally to present an opening through which index numbers may be viewed to facilitate setting of the levers 30. Each of the plates 38 is provided with a flange 46 visible through an opening cut in the cabinet of the machine, and said flange has engraved thereon the numerals from "0" to "9", as shown in Fig. 1. When it is desired to adjust the lever 30, the operator must grasp the end thereof and press down on the index guide 45, thereby causing the bell crank 34 to rock to disengage the pawl 35 from the notch 37. This will release the lever 30 and by maintaining the pressure on the guide 45, said lever may be adjusted to any desired position.

Each of the levers 30 is provided with segmental arms 47 (Fig. 11) which act as guards to keep the slots, through which the levers move, closed at all times. This prevents improper manipulation of the mechanism and also prevents foreign substances from getting into the mechanism which might cause the machine to operate improperly.

*Alining devices*

Figure 3:
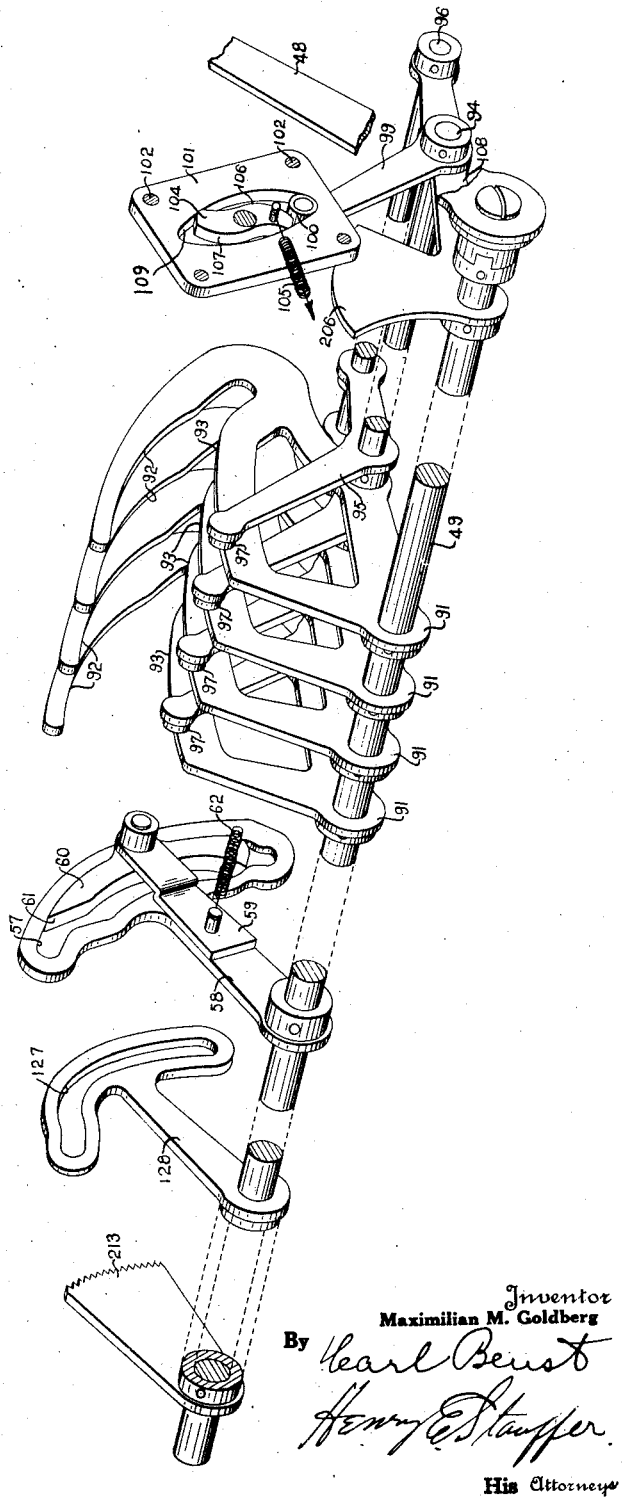
Fig. 3 is a perspective view of the main operating mechanism.

After the levers 30 have been adjusted, an operating lever 48 (Fig. 1) is rocked forwardly, and then backwardly. This lever is secured to the end of the main operating shaft 49 (Figs. 2 and 3), and operates the various mechanisms of the machine. The forward movement of the operating lever 48 engages the alining pawls 50 with alining teeth 51 formed on the lower ends of the levers 30 to hold them in their adjusted positions during the operation of the machine. The alining pawls 50 are secured to a shaft 52 journaled in the frames 32 and 33 of the machine. Also secured to the shaft 52 (Fig. 5) is an arm 53 bifurcated to engage a stud 54 on a bell crank 55 loose on the shaft 31 supported by the frames 32 and 33. The bell crank 55 has a roller 56 which projects into a slot 57 of an arm 58 pinned to the operating shaft 49. Secured to the arm 58 is a bracket 59 which has pivoted thereto a switch 60 having a flange 61, the upper end of which is normally held against one side of the slot 57 by means of a spring 62. The slot 57 is formed in a segmental part of the arm 58. The flange 61 and the slot 57 form a cam race for the roller 56 to control the movement of the alining pawls 50.

As the operating shaft 49 begins to rock in a counterclockwise direction (Fig. 5), that part of the cam race formed by the lower side of the flange 61 and the side of the slot 57 engages the roller 56 and rocks the bell crank 55 in a clockwise direction, thereby causing the arm 53 and the pawls 50 to be rocked in a counter-clockwise direction to engage the pawls 50 with the teeth 51 of the levers 30. Upon further counter-clockwise movement of the shaft 49 the cam race holds the bell crank 55 and the arm 53 in their moved positions, thereby holding the levers 30 in their adjusted positions. Near the end of the counter-clockwise movement of the shaft 49 and arm 58, the roller 56 contacts the end 63 of the switch 60, thereby causing it to rotate counterclockwise against the tension of the spring 62. After the roller 56 passes beyond the switch 60, the spring 62 will again return the switch to its normal position. During the return or clockwise movement of the arm 58 that portion of the race formed by the upper side of the flange 61 and the side of the slot 57 engages the roller 56 and rocks the bell crank 55 in a counterclockwise direction, and disengages the pawls 50 from the alining teeth 51 of the levers 30. After the pawls have been disengaged from the teeth 51, the levers 30 are returned to their zero positions by mechanism to be hereinafter described.

*Indicator mechanism*

When the levers 30 are adjusted as above described before an operation of the machine, a device is positioned for determining the extent and direction of movement of the indicators. This mechanism is provided so that the indicators can be adjusted directly to their new positions without first passing through their zero positions.

Secured to the side of each lever 30 is a rack 70 (Figs. 2 and 11) which meshes with a pinion 71 at all times. The pinion 71 is rotatably mounted on a bell crank 72 which is pivoted on the rod 31. The pinion 71 also meshes with teeth 73 on an actuator 74 also pivoted on the rod 31. The actuator 74 is normally held against movement by an alining pawl 75 secured to the shaft 52. When the pawl 50 is engaged with the teeth 51 of the lever 30, as above described, the pawl 75 is disengaged from the actuator 74. From this it is apparent that when the lever 30 is free to be manipulated, the actuator 74 is locked against movement; and when the actuator 74 is free to be adjusted, the lever 30 is locked against movement.

The actuator 74 is provided with teeth 76 which mesh with a gear 77 (Fig. 2) loosely mounted on a rod 78 carried by the frames 32 and 33. The gear 77 also meshes with a pinion 79 secured to the side of the indicator 80 journaled on a rod 81 carried by the frames 32 and 33. An opening 82 is provided in the cabinet through which the indicia on the indicator are displayed.

When the lever 30 is adjusted by the operator, the rack 70 will cause the pinion 71 to rotate in a counter-clockwise direction (Fig. 2). Since the actuator 74 is locked against movement at this time, the pinion 71 rolls over said actuator and rocks the bell crank 72 counterclockwise thereby causing said bell crank 72 to be positioned according to the setting of the lever 30.

Secured to the main operating shaft 49, and associated with each of the actuators 74, is an arm 91 (Figs. 2 and 3) having two cam surfaces 92 and 93. When the operating shaft 49 is rocked in a counterclockwise direction, after the lever 30 has been adjusted from the position shown in Fig. 2, as above mentioned, the cam surface 92 of the arm 91 will engage the roller 90 and thereby cause the bell crank 72 to be rocked in a clockwise direction. This will bring the roller 90 and the bell crank 72 back to the position shown in Fig. 2. It will be remembered that at this time, the actuator 74 is free to be moved and the lever 30 and rack 70 are locked against movement by the pawl 50. Therefore, when the bell crank 72 is rotated clockwise, as just described, the pinion 71 rotates counterclockwise and rolls over the rack 70 on the lever 30, now held against movement by the pawl 50, thus rotating the actuator 74 clockwise and setting the indicator into a position to indicate the amount set up by the lever 30.

Near the end of the operation of the machine, when the arms 91 are returning to their normal positions, after the alining pawls 50 have been disengaged from the levers 30, and the pawls 75 have been engaged with the actuators 74, the levers 30 are returned to their normal or zero positions. Carried by the arms 91 is a shaft 94, to which is secured an arm 95 for each of the levers 30. Each of the arms 95 is also secured to a rod 96 which causes them to move as a unit. Mounted on the upper end of each arm 95 is a roller 97 adapted to cooperate with an arm 98 on each lever 30.

Figure 13:
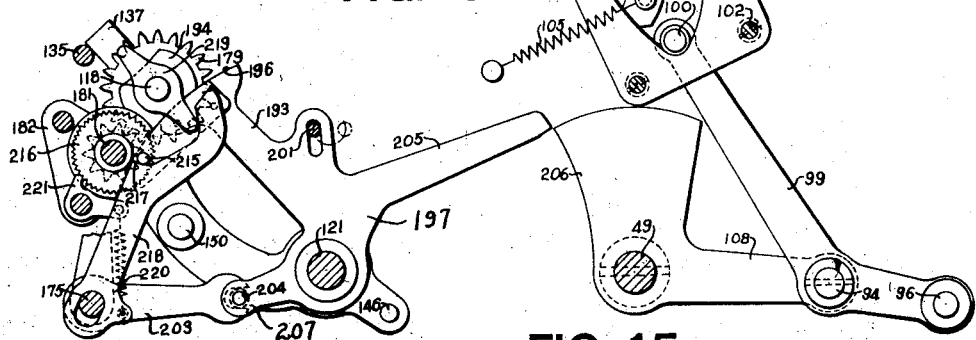
Fig. 13 is a detail view of the turn-to-zero mechanism for the totalizer and also of the mechanism for controlling the movement of the amount lever returning mechanism.

It will be remembered that the levers 30 are adjusted before the shaft 49 is operated. Therefore, it is necessary to provide a means for preventing the rollers 97 from engaging the lower end of the arms 98 when the shaft 49 is rocking in a counter-clockwise direction (Fig. 2). Secured to the shaft 94 and the rod 96 is an arm 99 (Figs 3 and 13) similar to the arms 95. The arm 99 carries a roller 100 projecting into a race 108 formed by the inner wall 109 of a block 101, secured to the frame 33 by screws 102, and a switch 104 pivoted on a stud 103, carried by the frame 33. The switch 104 is held in the position shown in Fig. 13 by means of a spring 105. When the operating shaft 49 is rocked counter-clockwise, the roller 100 is moved into that part of the race 108 formed by the side 106 of the switch 104, and the wall 109, thus rocking the arm 99, shaft 94 and the arms 95 in a clockwise direction, with the shaft 94 as the pivot point to prevent the rollers 97 from contacting the lower side of the arms 98 of the levers 30 during the upward movement of the arms 95. Near the end of the counter-clockwise movement of the shaft 49, the roller 100 (Fig. 13) rocks the switch 104 against the tension of the spring 105. When the roller 100 passes the upper end of the switch 104 the spring 105 returns said switch to its normal position, as shown in Fig. 13. When the shaft 49 receives its clockwise or return movement, the roller 100 enters that part of the race 108 formed by the switch side 107 and the wall 109, thus rocking the arm 99, shaft 94, and arms 95 counter-clockwise and the rollers 97 (Fig. 2) engage the upper side of the arms 98, and return the levers 30 to their home or normal positions. Near the end of the downward movement of the roller 100 (Fig. 13) it again rocks the switch 104 against the tension of the spring 105 and passes by the lower end of the switch and finally stops in the position shown in Fig. 13 and the spring 105 returns the switch to its normal position.

The return movement of the levers 30 rotates the pinions 71 in a clockwise direction. Since the actuators 74 are held by the pawls 75 in their adjusted positions, the pinions 71 roll over the actuators 74 and cause the bell cranks 72 to be moved clockwise, thereby causing the rollers 90 to be positioned a distance from the zero position, equal to the number of steps of movement which the levers 30 were moved. When the lever 30 is adjusted for the next succeeding operation, its associated bell crank 72 will again be adjusted counter-clockwise. However, during this movement, the bell crank 72 will start to move from the adjusted position in which it was left at the end of the last preceding operation.

Figure 21:
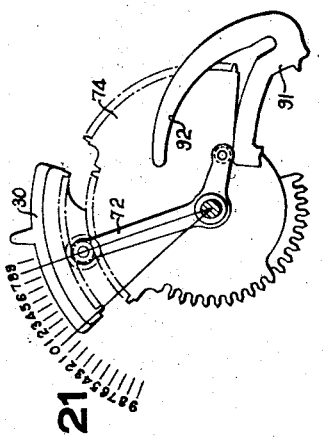
Figs. 19 to 27 are diagrammatic views showing the positions which the indicator setting mechanism assumes during certain typical operations of the machine.
Figure 24:
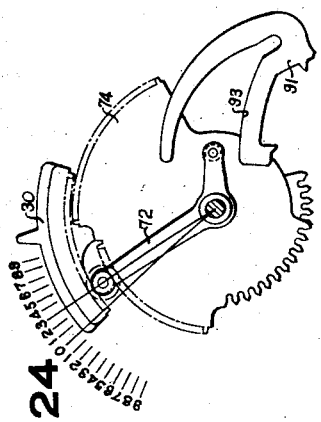
Figure 20:
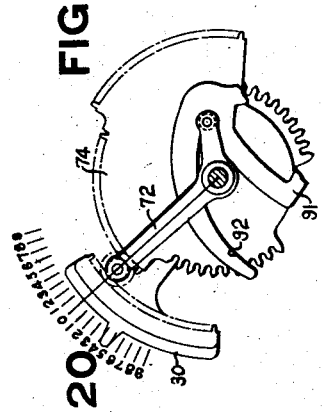
Figure 19:
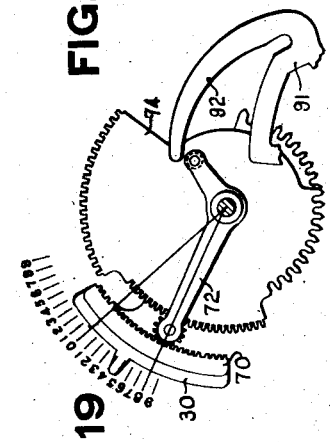

In order that the movement of the bell crank 72 may be better understood, it is shown in Figs. 19 to 27 in diagrammatic form, wherein the positions assumed by the various parts during certain operations of the machine are illustrated. In the diagrammatic views the parts are shown in different relative positions from that in Fig. 2 for the sake of convenience. The numbers 9, 8, 7, 6, 5, 4, 3, 2, 1, 0, 1, 2, 3, 4, 5, 6, 7, 8, 9, in these Figures 19 to 27 designate the positions of the bell crank 72, but not the positions of the lever 30. Referring now to Figs. 19, 20 and 21, let it be assumed that the lever 30 was set to zero during the preceding operation, at the end of which the bell crank 72 was left at its "0" position, and that during the next operation it is desired to indicate "8". The operator will, therefore, move the lever 30 to its "8" position, and since the actuator 74 is held against operation, the rack 70 will cause the pinion 71 and bell crank 72 to rotate counter-clockwise to the position shown in Fig. 19, which is eight steps below the "0" position of said bell crank. When the machine is operated, the cam surface 92 will cause the bell crank 72 to return to its "0" position as shown in Fig. 20. During this time the actuator 74 is free to rotate and the lever 30 is locked, and, therefore, the return movement of the bell crank 72 will rotate the actuator 74 in a direction to cause the indicator to move forwardly from "0" to "8" by means of the gears 77 and 79 (Fig. 2). After the indicator has been thus adjusted the lever 30 is returned to its zero position, thereby causing the bell crank 72 to assume its position "8" above its "0" position as shown in Fig. 21, in which position it will remain when the machine comes to rest.

Figure 23:
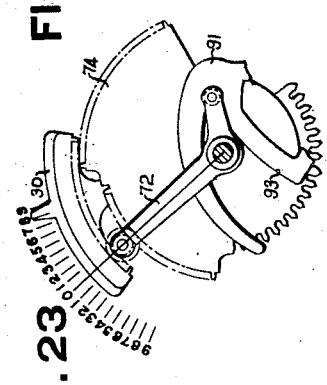
Figure 22:
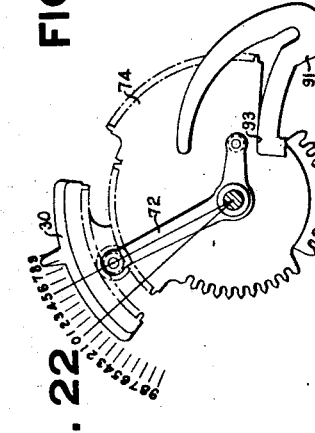

Now let it be assumed that during the next succeeding operation of the machine it is desired to indicate a "3". When the lever 30 is adjusted to its "3" position it will cause the bell crank 72 to rock counter-clockwise three steps from the position shown in Fig. 21 to its "5" position above the "0" position, as shown in Fig. 22. Then when the machine is operated the cam surface 93 will rock the bell crank 72 from the position shown in Fig. 22 to its "0" position, as shown in Fig. 23. It will be noticed that this movement of the bell crank is opposite to the movement it received during the preceding operation and that the distance it is moved is equal to five steps.

This will cause the indicator to rotate backwardly five steps from "8" to "3". After the indicator is thus adjusted the actuator 74 is again locked and the lever 30 unlocked and reset to its "0" position, thereby causing the bell crank 72 to rotate clockwise from its "0" position (Fig. 23) to its "3" position (Fig. 24), in which position it remains when the machine comes to rest.

Figure 27:
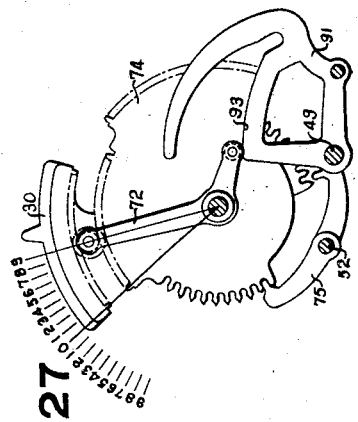
Figure 26:
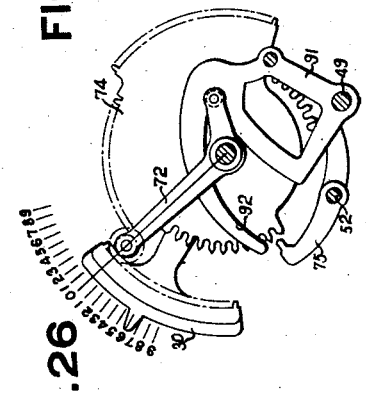
Figure 25:
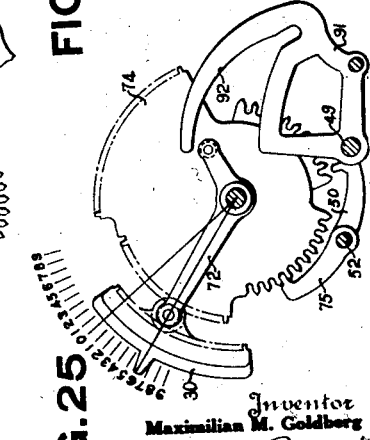

With the parts in these positions, let it be assumed that during the next operation it is desired to indicate a "9". When the lever 30 is adjusted to its "9" position it will cause the bell crank to rotate counter-clockwise nine steps, from the position shown in Fig. 24, and since the bell crank was left in its "3" position above its "0" position during the preceding operation, said bell crank will move past its "0" position to its "6" position below its "0" position, as shown in Fig. 25. When the machine is operated the cam surface 92 will rock the bell crank 72 clockwise six steps from the position shown in Fig. 25 to its "0" position, as shown in Fig. 26. This movement of said bell crank will cause the actuator 74 to rotate the indicator forwardly six steps from "3" to "9". After the indicator has been set and the actuator 74 locked in this position the lever 30 will be returned to its "0" position, thereby causing the bell crank 72 to move from the position shown in Fig. 26 to its "9" position, as shown in Fig. 27.

From the above it can be seen that the position to which the levers 30 are set will determine the adjustment of the bell crank 72, and the bell crank will subsequently control the amount and direction of movement of the actuators 74 and indicators 80, in such a manner that they will always be adjusted to their new positions directly by the shortest distance and without first passing through zero. It is also apparent that the levers 30 can be adjusted to their new positions for the succeeding operation without disturbing the adjustment of the indicators.

Only a front indication has been shown herein, but if it is desired, another set of indicators may be provided for indicating toward the rear of the machine. Any of the well known methods of connecting the two sets of indicators can be used, and therefore no disclosure or description is given herein.

*Totalizer*

A totalizer is provided for accumulating the amounts set up by the levers 30. This totalizer is provided with seven denominational wheels 116, thereby providing three overflow wheels. The number of denominational wheels may vary according to the registering capacity desired.

Each of the levers 30 has secured thereto a totalizer actuator 115 (Figs. 2 and 11). Each totalizer wheel 116 (Figs. 2 and 12) is provided with a gear 117 adapted to be rocked into engagement with the actuator 115 at the beginning of each operation of the machine. It will be remembered that the levers 30 are adjusted manually before the machine is operated. The wheels 116 are mounted on a shaft 118 carried by two arms, 119 and 120 (Figs. 2, 7, 8 and 10). The arms 119 and 120 are secured to a shaft 121 carried by the frames 32 and 33. The arm 119 has rigid therewith an arm 122 (Fig. 4), to which is pivoted one end of a link 123, the other end of which is pivoted to a bell crank 124 pivoted on the shaft 31 carried by the frames 32 and 33. The bell crank 124 is provided with a roller 126 which projects into a cam slot 127 in an arm 128 secured to the operating shaft 49.

The cam slot 127 is so formed that when the operating shaft 49 receives its counter-clockwise movement (Fig. 4) said slot will rock the bell crank 124 counter-clockwise, and by means of the link 123 and the shaft 121, will rock the arms 119 and 120 clockwise, thereby carrying the gears 117 (Figs. 2 and 8) into engagement with the segments 115. When the levers 30 are being returned to their zero positions, the actuators 115 secured thereto rotate their respective wheels 116 counter-clockwise, thereby adding the amount on the wheels according to the position to which the levers 30 were manually set. Near the end of the operation of the machine, the bell crank 124 is rocked clockwise, thereby causing the gears 117 of the totalizer wheels to be disengaged from the actuators 115.

Secured to each of the frames 32 and 33 are studs 135 and 136 (Figs. 4, 10, 12 and 13). The arms 119 and 120 are each provided with a projection 137. The studs 135 are provided to limit the movement of the totalizer when it is disengaged, and the studs 136 are provided to limit the movement thereof when it is engaged with the actuators 115.

*Transfer mechanism*

The mechanism provided for carrying 1 from a lower order element to a higher order element, when the lower element moves from "9" to "0", is of that type of transfer mechanism known in the art as a "simultaneous transfer". The totalizer wheels 16 are divided into twenty divisions; in other words, they are provided with two sets of digits, from "0" to "9", it requiring one-half rotation thereof to move the totalizer from "0" to "0". Each of the wheels 116 has secured thereto a twenty toothed ratchet 140 (Figs. 2, 6, 7, 8 and 10), each of which is provided with two high teeth 141. Adjacent each of the ratchets 140, except the units, is a lever 142 pivoted on the shaft 118. Pivoted to each lever 142 is a pawl 143 held in engagement with its ratchet 140 by a spring 144. A spring 145 stretched between a stud on each of the levers 142, and a rod 146 carried by a downwardly projecting arm of the arms 119 and 120, normally tends to rotate each lever 142 in a clockwise direction, but is prevented from doing so by a shoulder 148 formed on a latch arm 149 which engages a flange 147 formed on the lever 142 (Figs. 6 and 7). The latch arm 149 is loosely pivoted on a shaft 150 carried by the arms 119 and 120. Secured to the arms 149, by bars 151, are arms 152 each of which has a curved surface 154 in the path of a stud 153 carried by the pawls 143. Each arm 149 cooperates with the lever 142 of the next higher denomination, while the arm 152 secured thereto cooperates with the stud 153 of the next lower denomination. When any totalizer wheel is passing from "9" to "0", the high tooth 141 will cause pawl 143 associated therewith to rock clockwise (Fig. 7), thereby causing the stud 153 to rock the arm 152 in a counter-clockwise direction. This movement of said arm 152, through the bar 151, will rock the arm 149 counter-clockwise to disengage the shoulder 148 from the flange 147, thereby permitting the spring 145 to rotate the lever 142 clockwise. This clockwise movement of the lever 142 is arrested by a hook 154 formed on the upper end of the arm 149. This movement of the lever 142 is sufficient to cause its pawl 143 to engage the next tooth of the ratchet 140. The position that the mechanism assumes after the lever 142 has been tripped is shown in Fig. 8.

The tripping action just described takes place when the lower order wheel is passing from "9" to "0". If the wheel into which the transfer is to be carried is standing at "9", then it is necessary for this wheel to transfer "1" into the next higher order wheel, and it is therefore necessary to trip the level 142 for this next higher order. When the level 142 is being rotated clockwise by the spring 145, after being released by the pawl 143 of the lower order, and the wheel 116 for the next higher order is standing at "9", the pawl 143 will ride over the high tooth 141 on the ratchet 140 for this higher order wheel. In riding over the high tooth of this ratchet, the stud 153 thereon will cause the arm 152 of the next higher order to be rotated in a counter-clockwise direction, thereby tripping the lever 142 for the next higher order.

Figure 15:
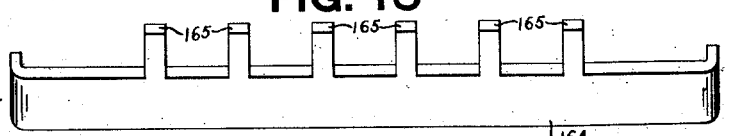
Fig. 15 is a detail view of the bar for causing the operation of the transfer carrying arms.

It is apparent that the tripping of the levers 142 is performed while the totalizer is engaged with the actuators 115. However, the actual carrying does not take place until during the disengaging movement of the totalizer. Carried by the frame 32 and 33 is a bar 164 having projections 165 (Figs. 7, 8 and 15). Each of the levers 142 is provided with a stud 166 which lies in the path of the one of the projections 165 on the bar 164. The studs 166 are engaged with the projections 156 when the totalizer is disengaged from the actuators 115. While the totalizer is being engaged with the actuators, the studs 166 are moved away from the projections 165. When the levers 142 are tripped as above described, and are permitted to rotate clockwise, the studs 166 of the trip levers 142 will be rocked toward the projections 165. Inasmuch as it is necessary to entirely disengage the gears 117 from the actuators 115 before the wheels 116 can be rotated to turn in a carry, a clearance has been provided between the stud 166 and the projections 165 sufficient to permit the totalizer to become disengaged before the studs 166 engage the projections. Continued movement of the totalizer will cause the studs 166 of the trip levers 142 to engage the projections 165, thereby causing the trip levers 142 to rotate in a counter-clockwise direction far enough to add "1" into their associated totalizer wheels.

From the above description it is apparent that all of the carries from a lower to a higher order are effected simultaneously, and that this carrying movement is effected by the movement of the totalizer itself when it is being disengaged from the actuators 115.

As above mentioned, there is a lever 142 provided for each of the totalizer wheels 116 except the units because a carry is never required to be made into the units wheel. However, the units wheel (Fig. 10) is provided with a ratchet 140 and a pawl 143. The pawl 143 for the units wheel is pivoted to a stud 167 carried by the totalizer arm 120. When the long tooth 141 of the units ratchet passes from "9" to "0" it will cause the pawl 143 to rock in clockwise direction, thus causing the stud 153 to rock the arm 152 for the units wheel, thereby disengaging the shoulder 148 on the arm 149, for the tens wheel, from the flange 147 of the lever 142 for this element to permit subsequent carrying into the tens element.

Each of the totalizer ratchets 140 has co-operating therewith a retaining pawl 168 (Figs. 7, 8 and 10) held in engagement therewith by a spring 169 stretched between a stud on the pawl 168 and a stud on the arm 149. This spring 169 is also utilized to hold the arm 149 in engagement with the flange 147 of the lever 142.

Means is provided to prevent accidental rotation of the totalizer wheels 116 when they are disengaged from the actuators 115. Secured to a shaft 175 (Fig. 2), carried by the frames 32 and 33, is an arm 176 cooperating with each of the pawls 143. The studs 153 on the pawls 143 rest against the upper ends of the arms 176 when the totalizer is disengaged from the actuators, thereby positively holding the pawls 143 in engagement with the ratchets. From this it is apparent that the totalizer wheels 116 cannot be rotated because the arms 176 prevent the pawls 143 from being disengaged from the ratchets 140.

*Turn-to-zero mechanism*

Figure 14:
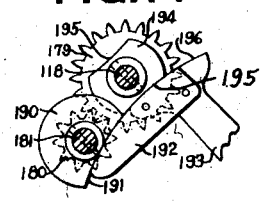
Fig. 14 is a detail view of a part of the turn-to-zero mechanism shown in Fig. 13.
Figure 16:
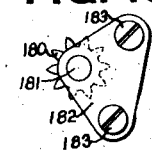
Fig. 16 is a detail view showing the method of supporting the end of the turn-to-zero shaft.
Figure 17:
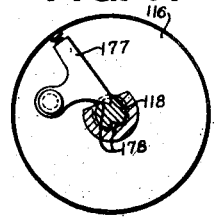
Fig. 17 is a detail view of one of the totalizer reading wheels taken on line 17—17 of Fig. 18.
Figure 18:
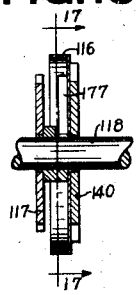
Fig. 18 is a sectional detail view of one unit of the totalizer elements, shown in Fig. 17.

A means is provided for manually turning the totalizer to zero. Each of the totalizer wheels 116 is provided with the well known turn-to-zero pawl 177 (Figs. 17 and 18), adapted to cooperate with one of the grooves 178 cut in the shaft 118. The shaft 118 is provided with two grooves 178 because the totalizer wheels are provided with two sets of numerals, and therefore it is only necessary to rotate the shaft 118, 180° in order to turn the totalizer wheels to zero. Also secured to the shaft 118 is a gear 179 (Figs. 13 and 14) which meshes with a pinion 180 secured to a short shaft 181 carried by a plate 182 (Fig. 16) and the side frame 33. The plate 182 is secured to the side frame 33 by screws 183. The shaft 181 projects through the cabinet and has secured thereto a knob 184 (Fig. 1). The ratio of the gears 179 and 180 is such that it requires one complete rotation of the knob 184 and the shaft 181 to rotate the shaft 118, 180°.

It will be remembered that the shaft 118 is carried by the totalizer arms 119 and 120, and therefore the gear 179 will be disengaged from the pinion 180 during each operation of the machine when the totalizer is rocked into engagement with the actuators 115. A means is provided to prevent the gear 179 and the pinion 180 from being rotated when the gear 179 is disengaged therefrom, so that when they are again rocked into engagement with each other, they will be in proper alinement. Secured to the shaft 181 (Fig. 14) is a locking plate 190 having a locking surface 191 which normally engages a block 192 secured to an arm 193 of a three-armed lever 197 (see also Fig. 13), carried by the shaft 121. The block 192 normally prevents the shaft 181 from being rotated. Secured to the gear 179 is a locking plate 194 having two locking surfaces 195 one of which normally engages a locking surface 196 of the arm 193. The locking surface 196 is long enough so that the locking plate 194 will be held in engagement therewith when the totalizer has been engaged with the actuators. This will prevent the gear 179 from being rotated when it is disengaged from the pinion 180.

When it is desired to rotate the shaft 118, and thereby turn the totalizer wheels to zero, it is necessary to first disengage the arm 193 and the block 192 from the locking plates 194 and 190 respectively. This is accomplished by a lock 200 (Fig. 1). A stud 201 (Fig. 13) is eccentrically mounted on the barrel of the lock 200 and projects into a slot in the arm 193. When the lock 200 is turned the stud 201 will scribe an arc, shown by dotted lines, and rock the arm 193 in a clockwise direction far enough to disengage it from the locking plate 194 and to disengage the block 192 from the locking plate 190, thereby permitting rotation of the shafts 180 and 118.

One complete clockwise rotation of the knob 184 (Fig. 1) will rotate the shaft 118 one half of a rotation. As the shaft is rotating the groove 178 will engage the pawls 177 and carry them and the wheels 116 to zero. When the wheels reach zero a stud 215 (Fig. 13) secured on a ratchet disk 216 will engage a shoulder 217 on an arm 218, thereby stopping further rotation of the knob 184 until after the totalizer has again been engaged with the actuator. When the totalizer moves to engage the actuators during the next operation, an arm 219 having two projections will cam the arm 218 in a clockwise direction thereby disengaging the shoulder 217 from the stud 215, whereupon the arm 218 will be forced upwardly by a spring 220 stretched between a stud on the arm 218 and a stud on a ratchet pawl 221. This upward movement of the arm 218 will release the turn-to-zero knob 184 because the shoulder 217 is out of the path of the stud 215 until during the next turn to zero operation. During a subsequent turn to zero operation the stud 215 is moved away from the arm 218 and the spring 220 rocks said arm counter-clockwise. This again places the shoulder 217 in the path of the stud 215. As the wheels 116 near the zero position the stud 215 again contacts the shoulder 217 and moves the arm 218 downwardly until it is stopped by the upper part of its slot contacting the shaft 175. When this occurs the wheels 116 will have reached zero and cannot be rotated farther. This mechanism is old and well known in the art.

The pawl 221 cooperates with the ratchet 216 to prevent backward movement of the knob 184.

Before the knob 184 can be rotated to turn the totalizer wheels to zero as just described, it is also necessary to move the arms 176 (Fig. 2) from beneath the studs 153 of the pawls 143. Secured to the shaft 175 (Fig. 13) is an arm 203 bifurcated to straddle a stud 204 carried by an arm 207 of the three-armed lever 197. When the lock 200 is turned, thereby rocking the arm 193 as above described, the stud 204 will cause the arm 203 and shaft 175 to rock in a counter-clockwise direction, and remove all of the arms 176 from beneath the studs of the pawls 143.

A means is provided to prevent operation of the operating lever 48 when the lock 200 has been turned for resetting the totalizer to zero. The lever 197 has an arm 205 adapted to be rocked into the path of a segmental arm 206 rigid with the arm 108. When the lock 200 is turned as just mentioned it is apparent that with the arm 205 in the path of the arm 206, it will be impossible to rock the shaft 49 to operate the machine. This means will also prevent the turning of the lock 200 after the machine has been partially operated. When the shaft 49 starts to rock, the upper surface of the arm 206 will be rocked beneath the arm 205 and thereby prevent movement of the stud 201. From this it is apparent that after the machine has once started it will be impossible to turn the lock 200, and therefore it will be impossible to turn the totalizer to zero with the machine in a partly operated position, and that it will also be impossible to operate the machine when the arm 193 has been rocked to permit turning to zero of the totalizer.

*Full-stroke mechanism*

Figure 9:
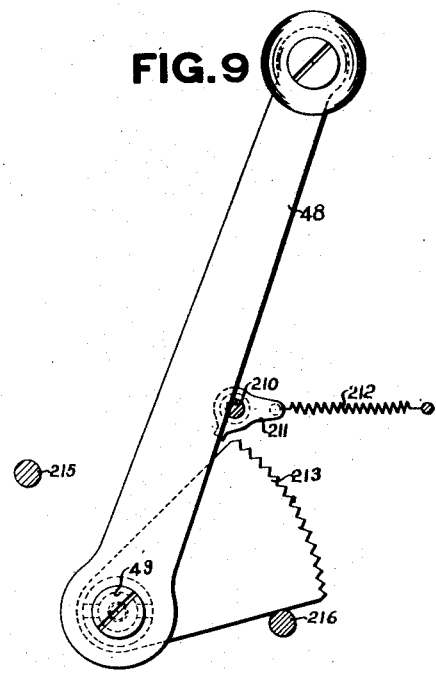
Fig. 9 is a detail view of the operating lever and of the full stroke mechanism.
Figure 10:
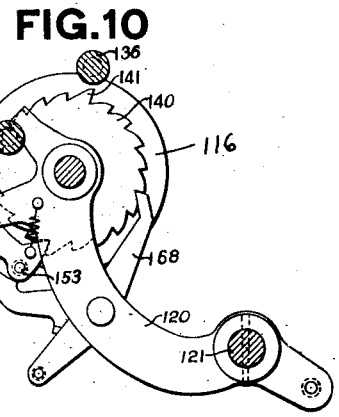
Fig. 10 shows the units totalizer element in the normal or untripped position.

A means is provided for forcing the operator to complete the forward and backward movements of the operating lever 48 after it has once started. Pivoted on a stud 210 (Fig. 9), mounted on the frame 32, is a pawl 211 held in the position shown by a spring 212. Secured to the shaft 49 is a ratchet segment 213 having ratchet teeth adapted to engage the pawl 211. The pawl 211 is so mounted on the stud 210 that after the segment 213 engages the pawl 211, it will prevent the segment 213 from moving backwardly until after the segment 213 has passed from beneath the pawl 211, whereupon the pawl 211 will be again positioned as shown in Fig. 9 by the spring 212. When the operator starts the return or backward movement of the operating lever 48, the segment 213 will again engage the pawl 211, and thereby prevent forward movement thereof until the return stroke is completed. This device is old and well known in the art and no further description is thought necessary.

Secured to the frame 32 is a stud 215 which acts as a stop for the operating lever when the segment 213 engages it at the end of the forward stroke of the handle 48. A stud 216 carried by the frame 32 acts as a stop for the operating handle at the end of the return stroke of movement.

*Operation*

A brief description of the operation of one differential unit of the mechanism will be given. It is to be understood that all the banks are alike and operate in the same manner.

When an amount is to be added into the totalizer, the amount lever 30 (Figs. 1 and 2) is adjusted by the operator, and said lever adjusts the bell crank 72. At this time the indicator actuator is held against movement by the pawl 75. After the amount lever has been adjusted, the operator will rock the lever 48 forwardly and engaging the pawl 50 with the teeth 51 of the amount lever, and disengaging the pawl 75 from the actuator 74. Continued movement of the operating lever will cause one of the cam surfaces 92 or 93 to engage the roller 90 on the bell crank 72, depending on the position in which the bell crank 72 was left during the preceding operation, and thereby carry the bell crank back to its zero position. This movement adjusts the actuator 74 and the indicators 80 to a position corresponding to the position to which the amount lever was set. Near the end of the forward stroke of the operating lever the totalizer will be engaged with the actuator 115; the pawl 50 will be disengaged from the amount lever teeth 51; and the pawl 75 will be engaged with the indicator actuator. At the beginning of the backward stroke of the operating lever the amount lever is returned to its normal or zero position by the roller 97. This movement will cause the amount set up to be added into the totalizer wheel by the actuator 115. During this adding operation, if a carry into the next higher totalizer wheel is required, the transfer lever 142 will be tripped. Near the end of the backward stroke of the handle the totalizer wheel will be disengaged from the segment 115 and this disengaging movement is utilized for causing all of the transfers to be entered simultaneously.

When it is desired to turn the totalizer to zero, the operator will give the knob 184 (Fig. 1) one complete rotation, which will give the totalizer shaft one-half rotation, which is sufficient to cause all of the totalizer wheels 116 to be returned to their zero positions. A mechanism is also provided to prevent another turn-to-zero operation until after another amount has been entered into the totalizer. This mechanism locks the turn-to-zero knob against rotation, but it is again unlocked when the totalizer moves to engage with its actuators.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, the combination of a manipulative device, a member adapted to be set by said device, means for holding said device in its adjusted position, means for moving said member from the position to which it is adjusted by said manipulative device to a certain position, an actuator adapted to be adjusted by said member when it is returned to the certain position, means for holding the actuator in its adjusted position, a means carried by said moving means for returning the manipulative device to its home position, and means to guide the returning means in its travel.

2. In a machine of the class described, the combination of a pivoted value determining device, a coaxially pivoted actuator controlled thereby, a pinion meshing with said device and with said actuator, and a cam for adjusting said pinion to a certain position and through the pinion adjust the actuator to the position determined by said device.

3. In a machine of the class described, the combination of a pivoted value determining device, a coaxially pivoted actuator controlled thereby, a pinion meshing with said device and with said actuator, a bell crank for supporting said pinion said bell crank pivoted coaxially with the device and actuator, and a cam capable of adjusting said bell crank in either direction for adjusting said actuator.

4. In a machine of the class described, the combination of a manually settable value determining device, an actuator controlled thereby, a pinion meshing with said device and with the actuator, a bell crank for supporting said pinion, adapted to be adjusted by said value determining device through said pinion, a cam for shifting said bell crank to a certain position in either direction for adjusting said actuator, and a lever carried by said cam for returning said device to its initial position.

5. In a machine of the class described, the combination of a manually settable value determining device, an actuator controlled thereby, a pinion meshing with said device and with said actuator, a bell crank for supporting said pinion and adapted to be adjusted by said value determining device through said pinion, a cam for shifting said bell crank to a certain position in either direction for adjusting said actuator, a lever carried by said cam for returning said device to its initial position, and a means for guiding said lever to render it ineffective in one direction and effective in the other direction.

6. In a machine of the class described, the combination of a manually settable value determining device, an actuator controlled thereby, a pinion meshing with said device and with said actuator, a bell crank for supporting said pinion, and adapted to be adjusted by said value determining device through said pinion, a cam for shifting said bell crank to a certain position in either direction for adjusting said actuator, a lever carried by said cam for returning said device to its initial position, and a means for rendering said lever ineffective when said cam is shifting said bell crank, and effective when said cam is moving to its initial position.

7. In a machine of the class described, the combination of a manually settable manipulative device, a projection thereon, a rocking member, a lever pivotally mounted on said rocking member, means for guiding said lever out of the path of said projection when said member rocks in one direction, and for guiding said lever into the path of said projection when rocking in the other direction thereby causing said device to return to its initial position.

8. In a machine of the class described, the combination of a rod, a settable lever pivoted on said rod, an indicator controlling rack rigidly connected to said lever, an indicator actuating segment pivoted on said rod, a pinion meshing with said actuating segment and with said indicator controlling rack, and a bell crank for supporting said pinion, said bell crank being pivoted on said rod and being adjustable by said lever through said pinion for controlling the adjustment of said indicator actuating segment.

9. In a machine of the class described, the combination of a differentially adjustable actuator; a variably movable means pivoted concentrically with said actuator for adjusting the actuator directly to any of its possible positions of adjustments; and a manually, differentially, adjustable lever pivoted concentrically with said actuator for actuating said means to determine the extent of movement of the actuator.

10. In a machine of the class described, the combination of a manually operated differentially adjustable member; an adjustable actuator mounted concentrically with said member; an adjustable device mounted concentrically with said member; and means intermediate said member and said actuator, and adapted to be moved by said member to adjust said device, and adapted to be moved by said device to adjust said actuator directly from any previously adjusted position to any of its other positions of adjustment as determined by said member.

11. In a machine of the class described, the combination of a manually operated differentially adjustable member; an adjustable actuator mounted concentrically with said member; an adjustable device mounted concentrically with said member; means intermediate said member and said actuator and adapted to be moved by said member to adjust said device, and adapted to be moved by said device to adjust said actuator directly from any previously adjusted position to any of its other positions of adjustment as determined by said member; an alining device adapted to cooperate with said member and said actuator; and a switch mechanism to operate said alining device to cause said device to cooperate with said member at a certain time and with said actuator at a certain time.

12. In a machine of the class described, the combination of a single value determining device being accessible from the exterior of the machine and adjustable prior to a machine operation, an arcuate actuator controlled thereby, an element directly connected with the value determining device, and with the actuator, so as to coordinate their movements, and means for adjusting the element to a certain position and through the element adjust the actuator to a position determined by the value determining device.

13. In a machine of the class described, the combination of a pivoted value determining device adjustable prior to a machine operation, an actuator controlled thereby, a pinion directly connected with the value determining device and the actuator to coordinate their movements, and means for adjusting the pinion to a certain position and through the pinion adjust the actuator to a position determined by the value determining device.

14. In a machine of the class described, the combination of a manually settable value determining device adjustable prior to a machine operation, an arcuate actuator, a pinion directly connected with the value determining device and the actuator to coordinate their movements, and means for adjusting the pinion to a certain position and through the pinion adjust the actuator to a position determined by the value determining device.

15. In a machine of the class described, the combination of a value determining device settable prior to a machine operation, an actuator controlled thereby, an element associated with the value determining device and the actuator, and having an arcuate path of movement, to coordinate the movements of the value determining device and the actuator, and means for adjusting the element to a certain position and through the element adjust the actuator to a position determined by the value determining device.

16. In a machine of the class described, the combination of a value determining device adjustable prior to a machine operation, an actuator controlled thereby, an element directly connected with the value determining device and the actuator, and having a curved path of movement, to coordinate the movements of the value determining device and the actuator, and means for adjusting the element to a certain position and through the element adjust the actuator to a position determined by the value determining device.

17. In a machine of the class described, the combination of a value determining device adjustable prior to a machine operation, an actuator controlled thereby, a pivoted support, an element connectd to the value determining device and the actuator, and having a fixed axis of movement with respect to the support, and means for adjusting the element to a certain position and through the element adjust the actuator to a position determined by the value determining device.

In testimony whereof I affix my signature.

MAXIMILIAN M. GOLDBERG.